Dec. 7, 1954   F. K. H. NALLINGER   2,696,203
STARTING DEVICE FOR INTERNAL-COMBUSTION ENGINES
Filed March 29, 1951
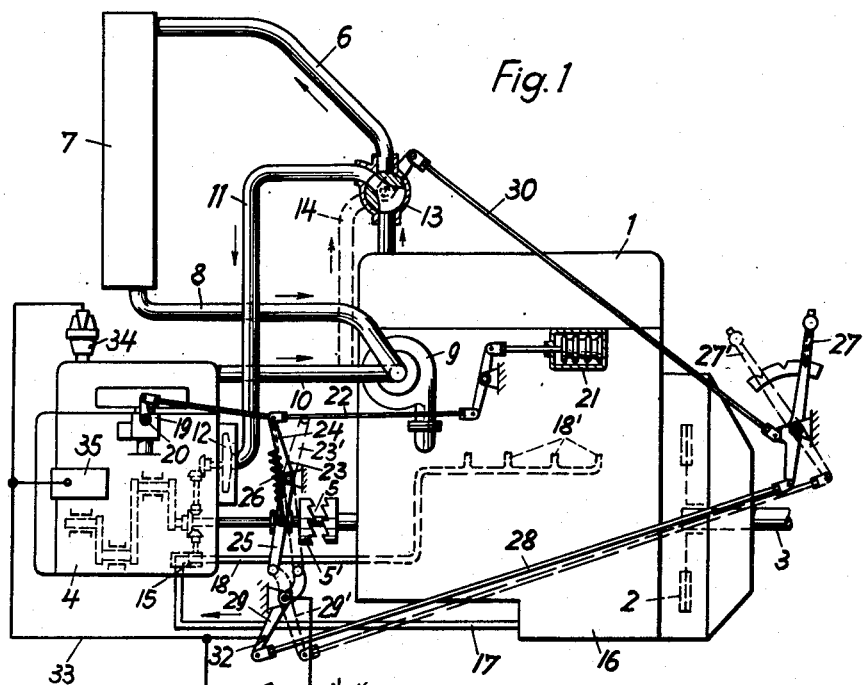
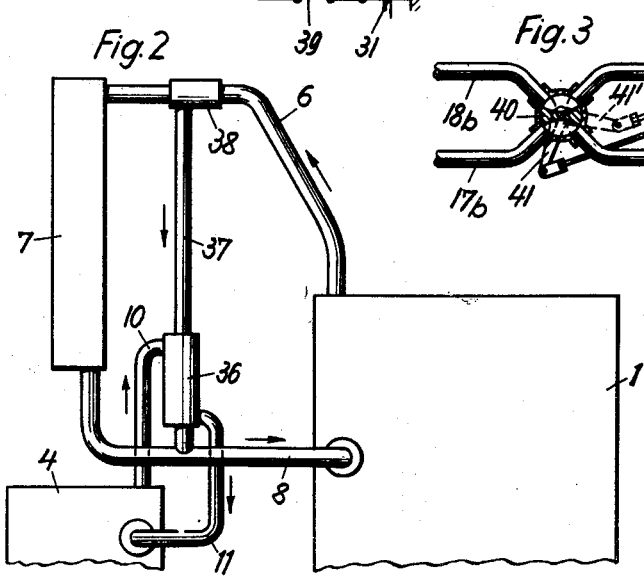
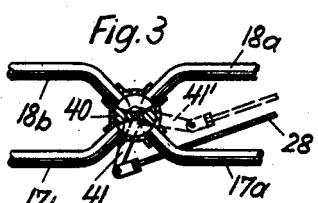
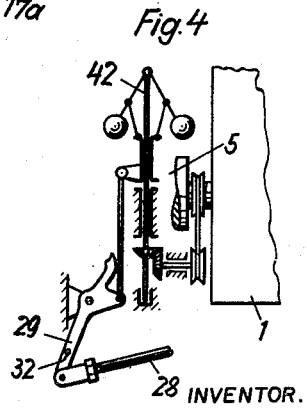
INVENTOR.
FRIEDRICH K.H. NALLINGER.
BY *Dicke and Padlor*
ATTORNEYS.

United States Patent Office 2,696,203
Patented Dec. 7, 1954

2,696,203

STARTING DEVICE FOR INTERNAL-COMBUSTION ENGINES

Friedrich K. H. Nallinger, Stuttgart, Germany, assignor to Daimler-Benz Aktiengesellschaft, Stuttgart-Unterturkheim, Germany Application March 29, 1951, Serial No. 218,132

18 Claims. (Cl. 123—179)

This invention relates to a starting device for internal combustion engines, more particularly for diesel propelled heavy lorries, busses or the like, where an auxiliary internal combustion engine is used for starting that internal combustion engine which serves as main driving engine.

The principal object of this invention is to improve the efficiency of said auxiliary engine for further facilitating the start of said main engine as well as for more economical working of the whole plant. Accordingly a main feature of this invention consists in the fact that said auxiliary engine is used for heating said main driving engine before the latter is started. This effect may be obtained by having said auxiliary engine serve to heat the water cooling system and/or the lubrication system of said main driving engine, the cooling water and/or the lubricating means of the main driving engine being eventually heated, according to further features of this invention, in the auxiliary engine itself and then being delivered therefrom to said main driving engine. However, according to other features of the present invention, heating may be effectuated by means of appropriate heat exchangers. According to further features of this invention said main driving engine, when heated, may be automatically started by said auxiliary engine, e. g. by means of a thermostat device disposed in the cooling system of said main engine. At the same time said auxiliary engine may suitably be adjusted for full power provided such adjustment has not been effected before. According to a further feature of this invention there is preferably provided a special device which will automatically stop the effect of said auxiliary engine produced on said main driving engine for instance when the latter is started or which permits deliberately to stop or to prevent said effect wholly or in part.

Moreover by this invention may be obtained a broadly automatical control for starting said main driving engine.

In the accompanying drawing two embodiments of this invention are illustrated by way of example, wherein:

Fig. 1 shows an engine plant providing direct heating by the auxiliary internal combustion engine of the cooling water and the lubricating means of the main driving engine and Fig. 2 shows a disposition providing a heat exchanger between the cooling system of said auxiliary internal combustion engine and that of the main driving machine.

Fig. 3 shows a device for interrupting the communication between the lubrication circuits of the main driving engine and the auxiliary engine.

Fig. 4 shows a switching device controlled by a speed responsive governor for controlling the connection between the main driving engine and the auxiliary engine.

The main driving engine 1 being for instance a vehicle driving diesel engine, drives a shaft 3 in any conventional manner by means of a clutch 2, a transmission gearing or the like. The auxiliary internal combustion engine 4 may be coupled with the main driving engine 1 through a starting clutch 5 by means of a slidable hub 5'. The heated cooling water of said main driving engine 1 will be delivered, in normal operation, through a pipe 6 to the radiator 7, from which the cooling water flows back to the cooling water pump 9 through a pipe 8. The cooling water of said auxiliary engine 4 will also flow to the cooling water jacket of said main driving engine 1 through a conduit 10 and may flow back, through a conduit 11, to said auxiliary engine or to a cooling water pump 12 driven by the latter. Regulation of the cooling water flowing from the cooling jacket of said main driving engine is effected by a valve 13, which in the position illustrated, will connect the cooling water jacket of said main engine 1 to the conduit 11, while in another position the cooling jacket is connected to the conduit 6 and the conduit 11 may be connected, for instance through a valve-gear disposed in another plane (as illustrated by dotted lines) of said valve, to a circulating conduit 14, serving as a kind of short circuit conduit between the conduit 10 and the conduit 11, which disposition, for instance owing to a second valve (not illustrated in the drawing) permits separating said conduit 10 from the cooling water pump 9. Said auxiliary engine 4, being for instance a gasoline motor, is moreover adapted to drive a little oil pump 15, which will suck, through a conduit 17, lubricating oil from the tank or from the oil sump 16 of the main driving engine and force it, through a conduit 18, directly into the bearings 18' of said main driving engine 1.

The auxiliary engine 4 is supplied by a carburetor 19, the throttle 20 of which is connected to a rod assembly 22 operated by a thermostat 21 arranged in the cooling jacket of said main driving engine 1. Said rod assembly serves to engage said clutch 5 by means of a snap mechanism 23, which may for instance consist of the two levers 24 and 25 interconnected by a tension spring 26 which will engage said clutch 5 by snap action from its left initial position (shown in full) to its right end position 23' (shown by dotted lines), as soon as a predetermined temperature of the cooling water is reached. Suitably there is interposed between the thermostat 21 and the snap mechanism 23 a servo-mechanism (not represented in the drawing). Furthermore for instance a manually displaceable lever 27 is provided, which lever will control on the one part, by means of a rod mechanism 28 a stop lever 29, and on the other part, by means of a rod mechanism 30, the valve 13 inserted in the cooling water system. Said stop lever 29, in its position as shown in full, will release said snap mechanism 23, while, in its end position 29' (as shown in dotted lines) it will prevent said snap mechanism 23 from being reversed, thus preventing the starting clutch 5 from being engaged or eventually disengaging the clutch 5 if engaged. Moreover the stop lever 29 is connected to a current source 31 in such a way as to close, when in the position as represented in full, a contact 32 thereby supplying current, through an electric conductor 33, to the ignition device 34 as well as to the starter 35 of the auxiliary engine 4. Said starter is suitably provided with a disconnecting device which will put it out of operation, as soon as the auxiliary engine 4 operates.

The arrangement as represented by Fig. 1 will work as follows:

To start the internal combustion engines plant the lever 27 is displaced from the position 27' to the position 27 as indicated in full. This will bring, on the one part, the valve 13 and, on the other part, the lever 29 in the position as represented in full. Through the contact 32 the auxiliary engine 4 is supplied with current and at the same time started by the starting device 35, the carburetor throttle 20 being adjusted on low speed. When said auxiliary engine 4 is started by said starting device 35, the cooling water of said auxiliary engine 4, being gradually heated, is delivered, through the conduit 10, to the cooling jacket of the main driving engine 1, it being allowed to flow back to the auxiliary engine 4 through the conduit 11. At the same time the lubricating means is sucked from the oil sump 16 of the main driving engine 1 by the pump 15 and directly forced into the bearings of said main driving engine 1. The sucked lubricating oil, before being delivered through the conduit 18 to the main driving engine 1, eventually may circulate wholly or in part, through the auxiliary engine 4 to lubricate it.

As soon as the main driving engine 1 or the cooling water circulating through it is heated, the thermostat 21 will expand. At a predetermined temperature the spring tension of the snap mechanism 23 is overcome, so that it will snap over to its other end position 23' as indicated in dotted lines. Hereby on the one part the throttle 20 is fully opened and on the other part said auxiliary engine 4 is coupled with said main driving engine 1 by the slidable hub 5' of the clutch 5. Said auxiliary engine 4 then operating at full power hereby will start said main driving engine 1, for instance with the main clutch 2 being disengaged.

If the auxiliary engine 4 is to be disengaged, the lever 27 is replaced into its end position 27' as indicated in dotted lines. Hereby the clutch 5 is positively released by the stop lever 29 and at the same time the current intended for the auxiliary engine 4 is interrupted at contact 32 which will put the auxiliary engine 4 out of operation. Moreover the valve 13 is brought back into that position which will permit the cooling water to flow from the main driving engine 1 through the conduit 6 to the main radiator 7. In a similar way the circulation 17, 15, 18 of the lubricating oil traversing said auxiliary engine 4 might be interrupted so that the lubrication of the main driving engine 1 would be effectuated exclusively by its own lubricating system (not illustrated in the drawing).

A valve device appropriate for said lubricating system is for instance shown by Fig. 3. The lever 41 of the valve 40 will connect, in the position as represented, the conduit 17a coming from the main engine to the conduit 17b leading to the auxiliary engine. Likewise the conduit portions 18a and 18b (corresponding to the conduit 18 as indicated in Fig. 1) are interconnected. If the lever 27 is displaced into the position 27', also the lever 41 is displaced, through the rod system 28, into the position 41', and at the same time the valve 40 is reversed so as to bring about a connection of the conduits 17a and 18a on the one part and of the conduits 18b and 17b on the other part.

Eventually the disposition may be made in such a way, that the auxiliary engine 4, even when the lever 27 is in the position 27', is supplied with current, e. g. by means of a switch 39 by-passing lever 29 and that it may be controlled at discretion or otherwise, e. g. by independent displacement of the throttle 20. In this case the cooling water may be delivered through the short circuit conduit 14.

If the main driving engine 1 is started in the heated condition, for instance by displacing the lever 27, direct coupling of the auxiliary engine 4 and the main driving engine 1 will take place, seeing that the thermostat 21 owing to the increased temperature of the cooling water is already in its state of expansion and has displaced the lever 24 of the snap mechanism 23 into the position as indicated by dotted lines. Displacing the stop lever 29 in this case has no other effect than that of making the lever 25 to follow the stop lever 29 under the action of the spring 26, thereby bringing the clutch hub 5' into the engaging position.

The disposition according to Fig. 2 will differ from that according to Fig. 1 only in the fact that the cooling water of said auxiliary engine 4 is not conveyed directly to the cooling jacket of the main driving engine 1, but to a heat exchanger 36, in which the temperature of the cooling water heated by the auxiliary engine 4 is transmitted to the cooling system of the main driving engine 1. For this purpose the heat exchanger 36 is for instance disposed in a short circuit conduit 37, which mutually connects the conduits 6 and 8 of the main cooling system, being controlled for instance by a thermostat 38. The remaining arrangement according to Fig. 2 may be similar to that of Fig. 1.

Instead of an electric method said auxiliary engine 4 may be started by compressed air or manually or in any other suitable way. For instance the clutch 5 may be constructed as a free wheeling device. Furthermore automatic disconnection of the auxiliary engine 4 may be arranged to become effective whenever the main driving engine 1 has reached a predetermined speed.

For instance instead of the lever 27 or in addition to it, a speed-responsive governor may be provided for this purpose, eventually acting on the centre of motion of said lever 29, as shown in Fig. 4. When the main engine 1 reaches a certain speed the fly balls 42 move outwardly raising the sleeve 43 and link 44 and rotating the lever 29 counter-clockwise toward the dotted line position 29¹ shown in Fig. 1. This disengages the clutch 5 and shuts off the auxiliary engine 4.

The present invention is available with driving engines for all purposes, not only for motor vehicle starting, but also for the start of automotive railway cars, of ship driving engines and of stationary installations or the like.

This invention is not restricted to the embodiments as set forth, but may be varied within the scope of the claims which follow.

What I claim is:

1. Internal combustion engines plant comprising a main driving motor, an auxiliary motor, a cooling liquid circulating system present in said main driving motor, another cooling liquid circulating system present in said auxiliary motor, means connecting said two cooling liquid circulating systems and adapted to convey cooling liquid from one system into the other, an independent lubrication oil circulation system present in said main driving motor, another independent lubricating oil circulation system present in said auxiliary motor and means connecting said two lubricating oil circulation systems in series and adapted to convey lubricating oil from one system into the other.

2. Internal combustion engines plant according to claim 1, furthermore comprising means for starting said main driving motor by said auxiliary motor.

3. Internal combustion engines plant comprising a main driving motor, an auxiliary motor, a lubricating oil circulation system present in said auxiliary motor, means for heating said main driving motor by the lubricating oil circulation system of said auxiliary motor, and means for starting said main driving motor by said auxiliary motor.

4. Internal combustion engines plant comprising a main driving motor, a cooling liquid circulation system for said motor, a radiator inserted in said system for cooling the cooling liquid heated by the motor, a short circuit conduit by-passing said radiator, a control mechanism for regulating the alternative passage of cooling liquid through said radiator or said short circuit conduit, a heat exchanger inserted in said short circuit conduit, an auxiliary motor and a cooling liquid circulation system for said auxiliary motor adapted to lead its cooling liquid through said heat exchanger.

5. Internal combustion engines plant according to claim 4, moreover comprising means for starting said main driving motor by said auxiliary motor and means for disconnecting said two motors from one another.

6. An internal combustion engine plant comprising a main driving motor, an auxiliary motor, means for heating said main driving motor by said auxiliary motor, means for starting said main driving motor by said auxiliary motor, and means responsive to the temperature of the main motor for rendering effective said starting means upon attaining a certain temperature in said main motor.

7. Internal combustion engines plant according to claim 6, further comprising means for controlling the output of said auxiliary motor, and means for coupling said means for starting said main driving motor with said means for controlling the output to raise the power output of said auxiliary motor, when the two motors are coupled.

8. Internal combustion engines plant comprising a main driving motor, an auxiliary motor, a clutch device disposed between said two motors adapted to drive said main driving motor by said auxiliary motor, means for engaging said clutch device, means for heating said main driving motor by the heat of said auxiliary motor, a thermostatic control device dependent upon the temperature of said main driving motor, and means for actuating said clutch engaging means by said thermostatic control device adapted to engage the clutch device as soon as said main driving motor has reached a predetermined increased temperature.

9. Internal combustion engines plant according to claim 8, furthermore comprising means adapted to disengage said clutch device and means adapted substantially to eliminate the effect of said auxiliary motor's heat on said main driving motor.

10. Internal combustion engines plant comprising a main driving motor, an auxiliary motor, a cooling liquid circulation system for said main driving motor, another cooling liquid circulation system for said auxiliary motor, means for thermically coupling said two cooling liquid circulation systems adapted to heat said main driving motor by said auxiliary motor through said cooling liquid circulation systems being coupled, a clutch device for coupling said two motors adapted to start said main driving motor by said auxiliary motor, a thermostatic actuating device for said clutch device answering to the temperature of said main driving motor and adapted to couple said two motors as soon as said main driving motor has reached a predetermined condition of temperature, and means adapted to stop or to prevent the engagement of said clutch device.

11. Internal combustion engines plant according to claim 10, moreover comprising an output control member for said auxiliary motor and means coupled with said thermostatic actuating device for actuating said output control member adapted to adjust it on full power of said auxiliary motor, if said coupling means are actuated.

12. Internal combustion engines plant according to claim 10, moreover comprising means connected with the aforesaid means and adapted to bring said auxiliary motor out of operation, if said clutch device is positively held disengaged.

13. Internal combustion engines plant according to claim 10, furthermore comprising an output control member for said auxiliary motor, means coupled with said thermostatic actuating device for actuating said output control member, adapted to adjust it on full power of said auxiliary motor, if said coupling means are actuated, means connected with said means for preventing said clutch device from being engaged and adapted substantially to suppress the thermic connection of the two motors and further means connected with said means for preventing said clutch device from being engaged and adapted to bring said auxiliary motor out of operation, if said clutch device is positively held disengaged.

14. An internal combustion engine plant comprising a main driving motor, an auxiliary motor, a cooling fluid circulating system present in said driving motor, another cooling fluid circulating system in said auxiliary motor, means connecting said two cooling fluid circulating systems and conveying cooling fluid from one system into the other, a lubricating oil circulating system present in said drive motor, another lubricating oil circulating system present in said auxiliary motor, means connecting said two lubricating oil circulating systems and conveying lubricating oil from one system into the other, and means for automatically starting said main driving motor by said auxiliary motor, including means responsive only to a predetermined temperature of said main motor for rendering effective said starting means when the main motor reaches a certain temperature.

15. An internal combustion engine plant comprising a main driving motor, an auxiliary motor, a cooling fluid circulating system present in said driving motor, another cooling fluid circulating system present in said auxiliary motor, means connecting said two cooling fluid circulating systems and conveying cooling fluid from one system into the other, a lubricating oil circulating system present in said drive motor, another lubricating oil circulating system present in said auxiliary motor, means connecting said two lubricating oil circulating systems and conveying lubricating oil from one system into the other, and means for automatically starting said main driving motor by said auxiliary motor, including means responsive to a predetermined temperature of said main motor for rendering effective said starting means.

16. An internal combustion plant comprising a main driving motor, an auxiliary motor, a fluid circulating system present in said auxiliary motor, means for heating said main driving motor by said fluid circulating system of said auxiliary motor, means for starting said main driving motor by said auxiliary motor, and means adapted to interrupt the driving connection between the two motors, means adapted to interrupt the thermic effect of the fluid system of said auxiliary motor on said main driving motor, and means adapted to actuate simultaneously said two interrupting means.

17. An internal combustion engine plant comprising a main driving motor, an auxiliary motor, an independent cooling fluid circulation system present in said auxiliary motor, means for starting said main driving motor by said auxiliary motor, an independent cooling fluid circulation system present in said main driving motor and a heat exchanger adapted to couple the two cooling fluid circulation systems in a heat exchanging connection.

18. Internal combustion engines plant according to claim 6, further comprising means for rendering ineffective said means for starting said main driving motor, and means for stopping said auxiliary motor upon operation of said last-named means.

References Cited in the file of this patent

UNITED STATES PATENTS

| Number | Name | Date |
|---|---|---|
| 1,182,531 | Doman | May 9, 1916 |
| 1,331,765 | Heinze | Feb. 24, 1920 |
| 1,440,815 | Bonta | Jan. 2, 1923 |
| 2,063,436 | Hild | Dec. 8, 1936 |
| 2,070,615 | Plante | Feb. 16, 1937 |

FOREIGN PATENTS

| Number | Country | Date |
|---|---|---|
| 134,605 | Great Britain | Sept. 20, 1919 |
| 597,815 | France | Sept. 11, 1925 |